Figure 1:
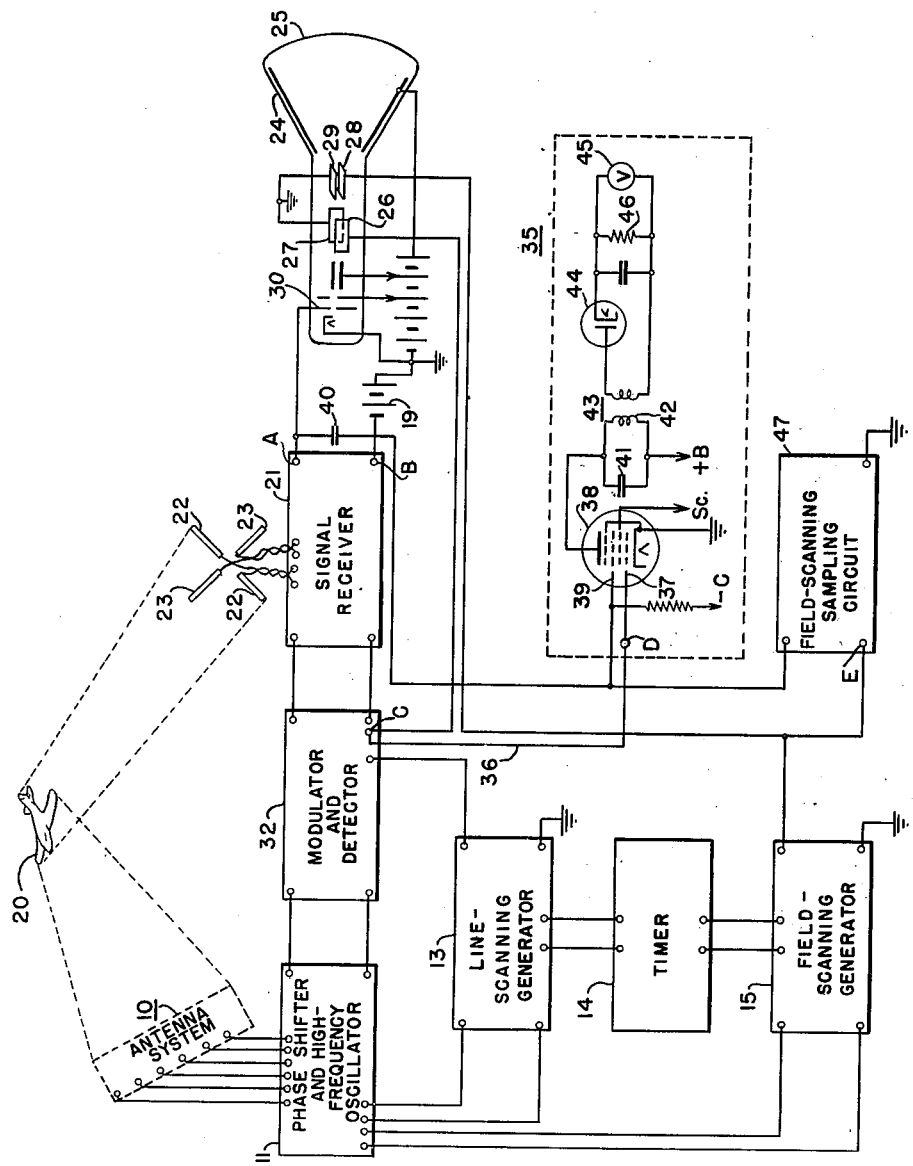

July 9, 1946.  A. V. LOUGHREN  2,403,729
COORDINATE DETERMINING SYSTEM
Filed July 2, 1942  3 Sheets-Sheet 2
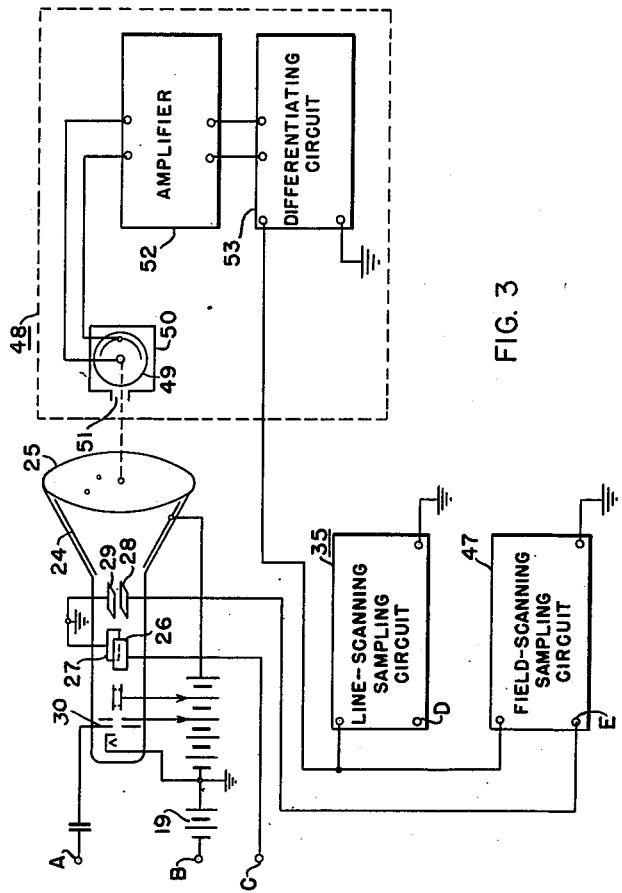
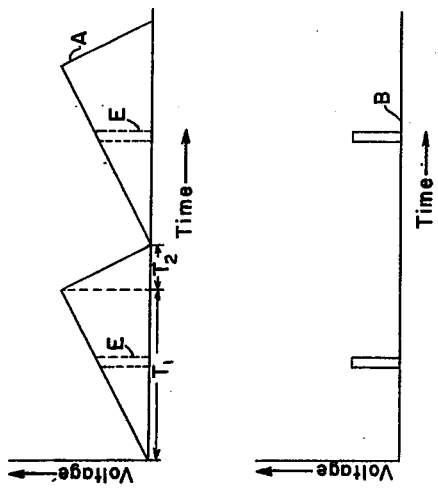
INVENTOR
ARTHUR V. LOUGHREN
BY *Harry C. Page.*
ATTORNEY INVENTOR
ARTHUR V. LOUGHREN
BY Harry C. Page.
ATTORNEY Patented July 9, 1946

2,403,729

UNITED STATES PATENT OFFICE 2,403,729

COORDINATE DETERMINING SYSTEM

Arthur V. Loughren, Great Neck, N. Y., assignor, by mesne assignments, to Hazeltine Research, Inc., Chicago, Ill., a corporation of Illinois Application July 2, 1942, Serial No. 449,393

13 Claims. (Cl. 250—11)

This invention relates in general to a system for determining the scanning coordinates of the position of an object within a predetermined scanned space and, in particular, to such a system of the type in which electrical signals representative of the coordinates of the object are derived.

Although the invention is adapted for a wide range of applications, it is particularly useful in the field of direction finding. One type of direction-finding system well known in the art comprises a signal-reproducing device having an indicating area and means for producing in the indicating area a signal pattern representing the location of an object within a predetermined space. A system of this type forms the subject matter of copending application Serial No. 395,172, filed May 26, 1941, in the name of Arthur V. Loughren. It has been proposed to provide a system of coordinates on the indicating area of the signal-reproducing device of such an arrangement so that an observer may obtain a visual indication of the coordinates of the position of the object in space. While such an indication is suitable in many instances, it will be appreciated that in many other instances such a visual indication is not sufficient. For example, in gun-controlling systems where accuracy is of paramount importance and where it is preferred to provide automatic control equipment, a visual indication of the coordinates is not suitable for controlling the system.

It is an object of the present invention, therefore, to provide an improved system for determining a scanning coordinate of the position of an object within a predetermined scanned space.

It is a further object of this invention to provide a system for determining a coordinate of the position of an object in space which avoids one or more of the above-mentioned limitations of the prior art arrangements.

It is still another object of this invention to provide an improved system for deriving an electrical signal representative of a scanning coordinate of the position of an object within a predetermined scanned space.

In accordance with the present invention, a system for determining the scanning coordinate in a given scanning direction of the position of an object within a scanned space comprises means for effectively scanning the space in a predetermined scanning pattern and for deriving a signal representing the scanning coordinate in the aforesaid given direction of the position of the object within the scanned space. The system also has means for deriving an electrical signal which represents any selected scanning coordinate of the scanned space in the above-mentioned direction and means responsive to the first-named signal for controlling the last-mentioned means to derive an electrical signal which represents the scanning coordinate in the aforesaid direction of the position of the object within the scanned space.

For a better understanding of the present invention, together with other and further objects thereof, reference is had to the following description taken in connection with the accompanying drawings, and its scope will be pointed out in the appended claims.

Figure 4:
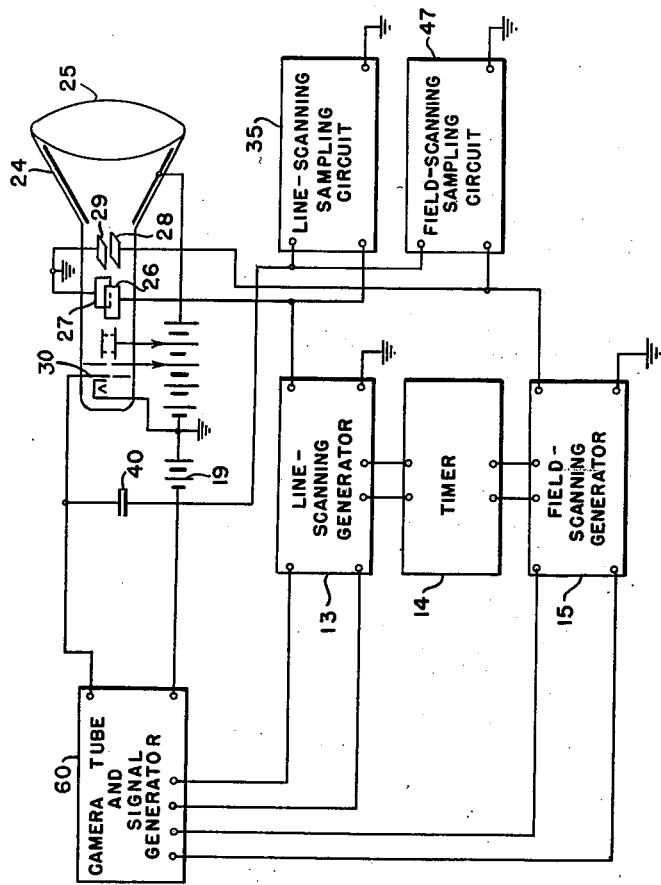

Fig. 1 of the drawings is a circuit diagram, partly schematic, of a system in accordance with the present invention for determining a coordinate of the position of an object within a predetermined space; Fig. 2 comprises a set of graphs which are used in explaining the operation of a portion of the arrangement of Fig. 1; Fig. 3 is a circuit diagram, partly schematic, of a modification of a portion of the arrangement of Fig. 1; while Fig. 4 is a circuit diagram, partly schematic, of a modification of the coordinate-determining system of the present invention.

Referring now more particularly to the drawings, there is represented in Fig. 1 a system in accordance with the present invention for determining a scanning coordinate of the position of an object, such as an airplane, within a predetermined scanned space. This system comprises means for effectively scanning the space in a predetermined scanning pattern to derive a time-modulated signal representing one scanning coordinate of the position of the object within the space. While any space-scanning means may be employed, it is preferred to utilize one of the type disclosed in applicant's above-identified copending application. The scanning means disclosed in the arrangement of Fig. 1 is substantially the same as that employed in the locating system disclosed in Fig. 2 of the above-identified copending application and corresponding elements thereof bear the same reference numerals. More specifically, the scanning means comprises a radiating system including means for radiating a sharply-concentrated beam and for causing the beam to scan a predetermined space in a predetermined scanning pattern. To this end there is provided an antenna system 10 including a plurality of signal radiators of the dipole-antenna type and a phase shifter and high-frequency oscillator 11 for applying a wave signal to the antenna system 10 for directive radiation effectively in the form of a sharply-concentrated beam. A line-scanning generator 13 is coupled to the high-frequency oscillator included in unit 11 for varying the relative phase of the signals as applied to the signal radiators of the antenna system 10 in a first dimension at a first predetermined frequency. A field-scanning generator 15 is also coupled to the high-frequency oscillator unit for varying the relative phase of the signals as applied to the signal radiators of antenna 10 in a second dimension at a second predetermined frequency. A timer 14 is coupled to the line-scanning generator 13 and field-scanning generator 15 for synchronizing their operation. It will be understood that the units 10 through 15 cooperate in a manner fully described in the aforementioned copending application to vary the direction of transmission of the sharply-concentrated beam radiated by antenna system 10 in two directions to scan a predetermined space with the beam.

When a reflecting body, such as an airplane 20, is included within the space scanned by the beam radiated by antenna system 10, a time-modulated signal representing the coordinate of the position of the object within the scanned space in a particular direction may be derived from energy reflected from the object. Means are provided for receiving such reflected energy comprising a wave-signal receiver 21 having a substantially nondirectional antenna system comprising two dipole antennas 22, 23. Antenna 22 is preferably parallel to the dipoles of antenna system 10, and antenna 23 is preferably at right angles thereto to provide a response to reflected waves having the polarization with which they were originally radiated or a polarization 90 degrees displaced from that radiated by antenna 10.

The system also includes signal-reproducing means responsive to the derived time-modulated signal for producing a visual indication of the coordinates of the object within the scanned space. This means comprises a conventional cathode-ray type signal-reproducing device 24 having a fluorescent screen 25 as an indicating area. There are also provided means for scanning the indicating area 25 with the electron beam of the reproducing device 24 in synchronism with the scanning beam of antenna system 10 so that the position of an indicating spot on the fluorescent screen 25 represents the direction of the object 20 from the antenna system 10. This scanning means comprises line-scanning plates 26, 27 and field-scanning plates 28, 29 to which are applied scanning voltages generated by line-scanning generator 13 and field-scanning generator 15, respectively. The line-scanning voltage is applied by way of a compensating means included in unit 32 for a purpose to be described presently.

The signal output of receiver 21 is applied to the brilliancy-control electrode 30 of tube 24 which comprises means responsive to the time-modulated signal for producing on the indicating area a visual indication of the coordinates of the object within the scanned space. Cathode-ray tube 24 is so biased by a source 19 that it is cut off in the absence of a received signal and suitable operating potentials are supplied to the other electrodes of the tube in a manner well understood in the art.

Due to the fact that some time is required for the transmitted signal to travel from the antenna system 10 to the airplane 20 and back to the antenna system 22, 23, cathode-ray tube 24 tends to become excited by receiver 21 with a time delay which may be sufficient to give an inaccurate coordinate indication in the line-scanning direction, although it will ordinarily be negligible in the relatively low-frequency field-scanning direction. Therefore, it is desirable to provide means for compensating for the time required for the signal to travel from the radiating system to the receiving means and this is accomplished by a compensating means comprising the modulator and detector unit 32. Unit 32 has one input circuit coupled to unit 11 whereby the signal output of the high-frequency oscillator is applied to the modulator unit. To another input circuit of unit 32 the signal output of receiver 21 is applied. A frequency-responsive network and detector included in unit 32 are coupled in cascade to the output circuit of the modulator and are responsive to beat notes representing the difference frequency of the signal inputs to the modulator. The detector unit preferably has a linear characteristic over the range of signal frequencies encountered in operation. The detector unit is so adjusted that the signal output thereof has such amplitude and polarity as to retard the line-scanning potential of tube 24 and cause it to correspond with the line-scanning potential of generator 13 at the time the signal being received left the antenna 10.

In considering the operation of the system as thus far described, it will be seen that antenna system 10 radiates a sharply-concentrated beam which scans a predetermined space in a predetermined scanning pattern and that signals reflected from the airplane 20 are picked up by the receiver 21, thereby to derive a time-modulated signal representing the scanning coordinate in one direction of the airplane 20 within the scanned space. It will also be seen that the cathode-ray beam of tube 24 is caused to scan the indicating area 25 synchronously with the scanning of the predetermined space by the beam radiated from the antenna system 10. While tube 24 is normally biased beyond its cutoff point, it is operated above its cutoff point by the time-modulated signal applied thereto from receiver 21 whereby a spot indication is provided on the fluorescent screen 25 representing the location of the airplane in the field scanned. Also, since the received signal is delayed in time with reference to the signal output of the high-frequency oscillator of unit 11 by the time interval required for the signal to travel from the antenna 10 out to the airplane 20 and back to the receiver 21, and since the frequency of the oscillator has been altered during this time by the action of the line-scanning generator 13, the difference frequency of these two signals is a measure of this time. This difference frequency causes an output voltage to be developed in the detector of unit 32 which is applied to the deflecting plates 26, 27 and is effective momentarily to back up or retard the line-scanning potential of tube 24 to cause it to correspond with the line-scanning potential generator 13 had at the time the signal being received left the antenna 10. Thus, a compensation is effected and the spot indication on the area 25 affords a visual indication of the coordinates of the airplane 20 within the scanned space. The system, as thus far described, is included in the locating system disclosed in Fig. 2 of the above-identified copending application and reference may be had thereto for a more complete description of the operation of this portion of the arrangement under discussion.

In order to derive an electrical, as well as a visual indication of a scanning coordinate of the airplane within the scanned space, means are included in the arrangement of Fig. 1 for deriving an electrical signal representative of any selected scanning coordinate of the scanning pattern in the above-mentioned direction, which means is controlled to derive an electrical signal that represents the desired coordinate of the airplane within the scanning pattern. This means, which is indicated generally as 35, includes a vacuum tube 38 having an input electrode 37 and a control electrode 39 to which a suitable source of biasing potential —C is coupled so as to bias the tube normally beyond cutoff. The output circuit of vacuum tube 38 includes a tuned circuit comprising a condenser 41 and primary winding 42 of a transfromer 43, the circuit being resonant at the frequency of a reference wave, to be described presently, applied to the input electrode 37. A peak rectifier device 44 is coupled through the transformer 43 to the output circuit of tube 38 to derive a signal therefrom which is applied to a long time-constant circuit comprising a condenser and load resistor 46. An indicating meter 45 is coupled to resistor 46. While load 46 is represented as a resistance, it will be understood that any circuit means adapted to utilize the derived signal may be used as a load for the rectifier.

The reference wave applied to input electrode 37 is related to those scanning coordinates of the scanning pattern provided by indicating device 24 that correspond to the coordinate of the airplane for which an electrical indication is desired. Thus, in the arrangement under consideration unit 35 derives an electrical signal representative of the coordinate of the airplane 20 in the line-scanning direction and, hence, the wave applied to input electrode 37 is related to the scanning coordinates in the line-scanning direction. While a reference-wave generator or oscillator may be utilized for supplying the reference wave to electrode 37, it is found expedient to provide means for deriving the reference wave directly from the line-scanning generator 13. To this end, the electrode 37 is coupled by way of conductor 36 and compensating unit 32 with the line-scanning generator. This coupling is through unit 32 in order that the reference signal may be compensated for the time required for the time-modulated signal to reach the receiver 21. The time-modulated signal output of receiver 21 is applied through coupling condenser 40 to control electrode 39, the latter comprising means responsive to the time-modulated signal for controlling unit 35.

Considering now the operation of unit 35, it will be seen that, since vacuum tube 38 is coupled to the line-scanning generator 13, a reference wave of saw-tooth wave form, which corresponds to the line-scanning voltages applied to the high-frequency oscillator 11 and to the line-scanning means of the reproducing device 24, is applied to the input electrode 37. This wave is represented by curve A of Fig. 2 and comprises a trace portion $T_1$, corresponding to the time required for the scanning means to perform one line-scanning operation, and a retrace portion $T_2$, corresponding to the retrace interval of the scanning means. Thus, it will be seen that the instantaneous values of the reference wave A during the period $T_1$ represent line-scanning coordinates in the scanning pattern.

In the absence of received signals, the bias —C biases the vacuum tube 38 beyond cutoff and no signal appears in its output circuit. However, when a time-modulated signal is received by receiver 21 and applied to control electrode 39, it biases vacuum tube 38 above cutoff to derive an electrical signal from the reference wave that represents the coordinate of the object 20 in the line-scanning direction. In Fig. 2, curve B illustrates such a received time-modulated signal having an amplitude characteristic which is varied with time and representing the line-scanning coordinate of the object 20 within the scanned space, it being assumed that the object 20 is sufficietly large to reflect energy from the radiated beam to the receiver 21 in a plurality of line-scanning operations. By projecting the curve B upon curve A, there are determined the pulses E which comprise electrical signals representing the line-scanning coordinate of the airplane 20 within space and which are derived across the indicating meter 45 and load resistor 46 of unit 35. Since the time-modulated signal B is delivered to units 32 and 35 simultaneously, whereby the line-scanning voltage applied to input electrode 37 is momentarily backed up or compensated to take into account the time for the signal to travel from the antenna system 10 to the receiver 21, the signal derived in unit 35 represents the true phase relationship between the time-modulated signal and the scanning voltage. Thus, it will be seen that unit 35 comprises means responsive to the relative phase of the reference wave and the time-modulated signal for deriving an electrical signal representative of the line-scanning coordinate of the airplane 20 within the scanned space. Further, it will be seen that this means is responsive to an instantaneous amplitude characteristic of the reference wave.

It has already been pointed out that the beam radiated by the antenna system 10 is deflected in two directions and scans the predetermined space in a two-dimensional scanning pattern. Therefore, the time-modulated signal derived in the scanning operation represents the scanning coordinates of the position of the airplane 20 within space in both a line-scanning direction and a field-scanning direction. Unit 35 has been shown to be effective to derive an electrical signal representative of the coordinate of the airplane within space in a line-scanning direction. In order to obtain a similar electrical signal representative of the coordinate of the airplane within space in the field-scanning direction, a field-scanning sampling circuit 47 comprising an arrangement substantially identical to that of unit 35, is provided. The refernce wave in this instance, however, is supplied directly from the field-scanning generator 15 to unit 47 for the reason that the delay of the signal in traveling from the antenna system 10 to the signal receiver 21 by way of reflection from the body 20 is assumed to have a negligible effect in the field-scanning direction. The time-modulated signal received by receiver 21 is also applied to unit 47 and, in a manner already described in connection with unit 35, an electrical signal is derived in unit 47 which is representative of the coordinate of the airplane 20 within space in the field-scanning direction. Hence, it may be seen that, in the arrangement of Fig. 1, the reproducing device 24 affords a visual indication of the coordinate of an object in space with respect to both the line and field-scanning directions and units 35 and 47, respectively, produce electrical signals representative of the coordinates of the object within space in line-scanning and field-scanning directions.

It will be appreciated that, when a plurality of airplanes is included within the space scanned by the beam from antenna system 10, the derived time-modulated signal represents the scanning coordinates of the position of each airplane within the scanned space. Under such operating conditions, several indications, represented by the spots on the fluorescent screen 25 of Fig. 3, are produced, each of which represents visually the coordinates of one of the airplanes within the scanned space. The line-scanning sampling circuit and field-scanning sampling circuit may also derive a plurality of electrical signals individually representing the coordinates of each of the airplanes within the scanned space. To facilitate the operation of the system of this invention under such operating conditions, and to derive electrical signals representative of the coordinates of a predetermined one of the airplanes within the space, the system may be modified as indicated in Fig. 3 to include means for selectively applying only a portion of the time-modulated signal to the sampling circuits. Referring now more particularly to Fig. 3, there is disclosed an arrangement of the signal-reproducing device 24, line-scanning sampling circuit 35, field-scanning sampling circuit 47, and a means 48 for applying a selected portion of the time-modulated signal to the sampling circuits. The arrangement of Fig. 3 may be substituted in the arrangement of Fig. 1 by connecting the terminals A, B, C, D, and E of Fig. 3 to the correspondingly identified terminals of Fig. 1. Unit 48 comprises a photocell 49 around which there is a shield 50 having a relatively narrow aperture 51. The output circuit of photocell 49 is connected through an amplifier 52 and a differentiating circuit 53 to the line-scanning sampling circuit 35 and the field-scanning sampling circuit 47.

Considering now the operation of the arrangement of Fig. 3, it will be understood that units 24, 35 and 47 operate in precisely the same manner in response to an applied time-modulated signal as described in connection with the arrangement of Fig. 1. It will be seen that by moving aperture 51 across fluorescent screen 25, radiated energy from any of the direction-indicating spots on fluorescent screen 25 may be caused to energize photocell 49. The signal output of the cell 49 is amplified in amplifier 52, differentiated in differentiating circuit 53, and utilized to overcome the normal cutoff bias on the sampling circuits 35 and 47 so that the sampling circuits individually develop electrical signals representative of the coordinates in the line-scanning and field-scanning directions for the particular signal which is at the moment supplying energy to the photocell 49. Thus, it may be seen that the unit 48 is effective to supply to the sampling circuits 35 and 47 only that portion of the time-modulated signal which corresponds to the particular airplane whose coordinates of direction it is desired to indicate by way of electrical signals. The differentiating circuit 53 is provided so that the sampling circuits are responsive only to relatively rapid changes in the signal input to the photocell 49. Such a rapid change in the signal input to photocell 49 will be developed each time the scanning beam of tube 24 becomes incident upon the particular spot on the fluorescent screen 25 which is being utilized to supply energy to the photocell 49.

The arrangement of Fig. 4 is directed to a system for determining the scanning coordinates of the position of an object within a predetermined space in accordance with the present invention and is generally similar to the arrangement of Fig. 1, differing therefrom in that a camera tube and signal generator 60 are employed for deriving the time-modulated signal in place of the units 10, 11, 32 and 21 of the arrangement of Fig. 1. Corresponding elements of the two systems bear identical reference numerals and it will be understood that the units individually operate in substantially the manner already described. The camera tube and cathode-ray signal-generating device 60 is of a conventional design and may, for example, be similar to the signal-generating device represented in Fig. 1 of United States Letters Patent 2,254,435, granted September 2, 1941 to Arthur V. Loughren, and assigned to the same assignee as the present application. This unit includes a signal-generating tube having the usual electron gun, photosensitive target, and scanning elements. Beam-deflecting voltages are applied to the deflecting elements from line-scanning generator 13 and field-scanning generator 15 to deflect the beam of the cathode-ray tube in two directions normal to each other to scan the photosensitive target in conventional manner.

In considering the operation of the arrangement of Fig. 4, it will be assumed that an image of the space including the object whose coordinates it is desired to determine is focused upon the target of the cathode-ray signal-generating tube and that the electron beam of the tube is caused to scan the target in a series of fields of parallel lines, thereby effectively to scan the space including the object and to derive the time-modulated signal representing the scanning coordinates of the position of the object within space. This time-modulated signal in turn is applied to the brilliancy-control electrode 30 of the reproducing device 24 and to the control electrodes of the vacuum tubes included in the line-scanning sampling circuit 35 and field-scanning sampling circuit 47 whereby there is produced, in a manner fully described above, a visual indication on area 25 of the coordinates of the object as well as electrical signals which represent the scanning coordinates of the object. It will be understood that in this modification of the invention there is a negligible time delay between the scanning operation at the signal generator 60 and the corresponding scanning operation in the reproducing device 24. Consequently, the compensating means provided in the arrangement of Fig. 1 is not necessary in the arrangement under consideration.

In generating video-frequency signals by means of a cathode-ray type signal-generating tube, undesirable transients are produced at the end of the line-trace period and during the line-retrace period. It is conventional to provide a blanking pulse generator which introduces into the generated video-frequency signal blanking pulses extending in the black direction to compensate the undesired transients so developed. While it is preferred that unit 60 include such a blanking pulse generator, means should also be included for reversing the polarity of the generated video-frequency signal before the application thereto of the blanking pulse. It will be understood that a video-frequency signal corresponding to an airplane in a light sky comprises a substantially white signal having a single pulse extending to the black level which represents the airplane. If the blanking pulses are added to such a signal, the sampling circuits 35 and 47 would respond to the blanking signals and provide an erroneous indication of a coordinate. To eliminate this source of error, it is proposed that the generated video-frequency signal be reversed in polarity so that it effectively comprises a substantially black signal having a single white pulse representing the position of the airplane in space. When the blanking pulses are superimposed on such a signal, only the white pulse representing the co-ordinate positions of the object is effective to control the sampling circuits.

From the foregoing description of the arrangement of Figs. 1 and 4, it will be seen that the term "object" as employed in the specification and claims of this application refers to a physical device or an image of the device. It will be understood, particularly in view of the discussion of Fig. 3, that this invention may also be used to determine the coordinates of a light spot on the screen of a cathode-ray tube and, accordingly, the term "object" also embraces a light spot.

It will be further understood that while the invention has been described in connection with systems employing rectilinear scanning, the invention is not limited thereto but is equally applicable to other types of scanning systems.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for determining the scanning co-ordinate in a given scanning direction of the position of an object within a scanned space comprising, means for effectively scanning said space in a predetermined scanning pattern and for deriving a signal representing the scanning coordinate in said scanning direction of the position of said object within said space, means for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

2. A system for determining the scanning co-ordinate in a given scanning direction of the position of an object within a scanned space comprising, a radiating system including means for radiating a sharply concentrated beam and for causing said beam to scan said space in a predetermined scanning pattern, means for deriving from said beam a signal representing the scanning coordinate in said scanning direction of the position of said object within said space, means for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

3. A system for determining the scanning co-ordinate in a given scanning direction of the position of an object within a scanned space comprising, a radiating system including means for radiating a sharply concentrated beam and for causing said beam to scan said space in a predetermined scanning pattern, means for deriving a signal from energy of said beam reflected from said object and representing the scanning coordinate in said scanning direction of the position of said object within said space, means for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

4. A system for determining the scanning co-ordinate in a given scanning direction of the position of an object within a scanned space comprising, a radiating system including means for radiating a sharply concentrated beam and for causing said beam to scan said space in a predetermined scanning pattern, means for deriving a signal from energy from said beam reflected from said object and representing the scanning coordinate in said scanning direction of the position of said object within said space, means for deriving an electrical signal which represents any selected scanning coordinate of said space in said scanning direction, means responsive to said first-named signal for controlling said last-mentioned means to derive an electrical signal which represents the scanning coordinate in said scanning direction of the position of said object within said space, and means for compensating said first-named signal for the time required for said energy of said beam to travel from said radiating system to said object and to said means for deriving said first-named signal.

5. A system for determining the scanning co-ordinate in a given scanning direction of the position of an object within a scanned space comprising, a cathode-ray type signal generator including a target upon which an image of said space is focused, means for producing an electron beam and for causing said beam to scan said image in a predetermined scanning pattern to derive a signal representing the scanning co-ordinate in said scanning direction of the position of the image of said object within said scanned image, means for deriving an electrical signal which represents any selected scanning co-ordinate of said scanned image in said scanning direction, and means responsive to said first-named signal for controlling said last-mentioned means to derive an electrical signal which represents the scanning coordinate in said scanning direction of the position of the image of said object within said scanned image.

6. A system for determining the scanning co-ordinate in a given scanning direction of the position of an object within a scanned space comprising, means for effectively scanning said space in a predetermined scanning pattern and for deriving a signal representing the scanning coordinate in said scanning direction of the position of said object within said space, means for deriving a reference wave having instantaneous amplitude values related to the scanning coordinates in said scanning direction of said space, means responsive to said reference wave for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

7. A system for determining the scanning coordinate in a given scanning direction of the position of an object within a scanned space comprising, means for effectively scanning said space in a predetermined scanning pattern and for deriving a signal representing the scanning coordinate in said scanning direction of the position of said object within said space, means for deriving a reference wave having instantaneous amplitude values related to the scanning coordinates in said scanning direction of said space, means responsive to an amplitude characteristic of said reference wave for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

8. A system for determining the scanning coordinate in a given scanning direction of the position of an object within a scanned space comprising, means for effectively scanning said space in a predetermined scanning pattern and for deriving a signal representing the scanning coordinate in said scanning direction of the position of said object within said scanned space, means for deriving a reference wave having instantaneous amplitude values related to the scanning coordinates in said scanning direction of said space, means responsive to said reference wave for deriving an electrical signal which represents any selected scanning coordinate of said space in said scanning direction and including a vacuum tube having a control electrode, and means for applying said first-named signal to said control electrode for controlling said last-mentioned means to derive an electrical signal which represents the scanning coordinate in said scanning direction of the position of said object within said space.

9. A system for determining the scanning coordinate in a given scanning direction of the position of an object within a scanned space comprising, means for effectively scanning said space in a predetermined scanning pattern and for deriving a signal representing the scanning coordinate in said scanning direction of the position of said object within said space, a generator for controlling the scanning component of said scanning means in said scanning direction, means coupled to said generator for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

10. A system for determining the scanning coordinate in a given scanning direction of the position of an object within a scanned space comprising, means for effectively scanning said space in a predetermined scanning pattern and for deriving a signal representing the scanning coordinate in said scanning direction of the position of said object within said space, means for deriving a reference wave having instantaneous amplitude values corresponding to the scanning component of said scanning pattern in said scanning direction, and means responsive to the relative phase of said reference wave and said first-named signal for deriving an electrical signal which represents the scanning coordinate in said scanning direction of the position of said object within said space.

11. A system for determining the scanning coordinate in a given scanning direction of the position of an object within a scanned space comprising, means for effectively scanning said space in a predetermined scanning pattern and for deriving a signal representing the scanning coordinate in said scanning direction of the position of said object within said space, signal-reproducing means responsive to said signal for producing a visual indication of the scanning coordinate in said scanning direction of the position of said object within said space, means for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

12. A system for determining the scanning coordinate in a given scanning direction of the position of an object within a scanned space comprising, means for effectively scanning said space in a predetermined scanning pattern and for deriving a signal representing the scanning coordinate in said scanning direction of the position of said object within said space, a cathode-ray type signal-reproducing device including an indicating area, means for scanning said indicating area in synchronism with the scanning of said space, means responsive to said signal for producing on said indicating area a visual indication of the scanning coordinate in said scanning direction of the position of said object within said space, means for deriving an electrical signal which represents any selected scanning coordinate of said space in said scanning direction, and means responsive to said first-named signal for controlling said last-mentioned means to derive an electrical signal which represents the scanning coordinate in said scanning direction of the position of said object within said space.

13. A system for determining the scanning coordinate in a given scanning direction of the position of a particular one of a plurality of objects within a scanned space comprising, means for effectively scanning said space in a predetermined scanning pattern and for deriving a signal representing the scanning coordinate in said scanning direction of the position of each of said objects within said space, means for deriving an electrical signal which represents any selected scanning coordinate of said space in said scanning direction, and means responsive to a selected portion of said first-named signal for controlling said last-mentioned means to derive an electrical signal which represents the scanning coordinate in said scanning direction of the position of said particular object within said space.

ARTHUR V. LOUGHREN.